United States Patent Office 2,732,734
Patented Jan. 31, 1956

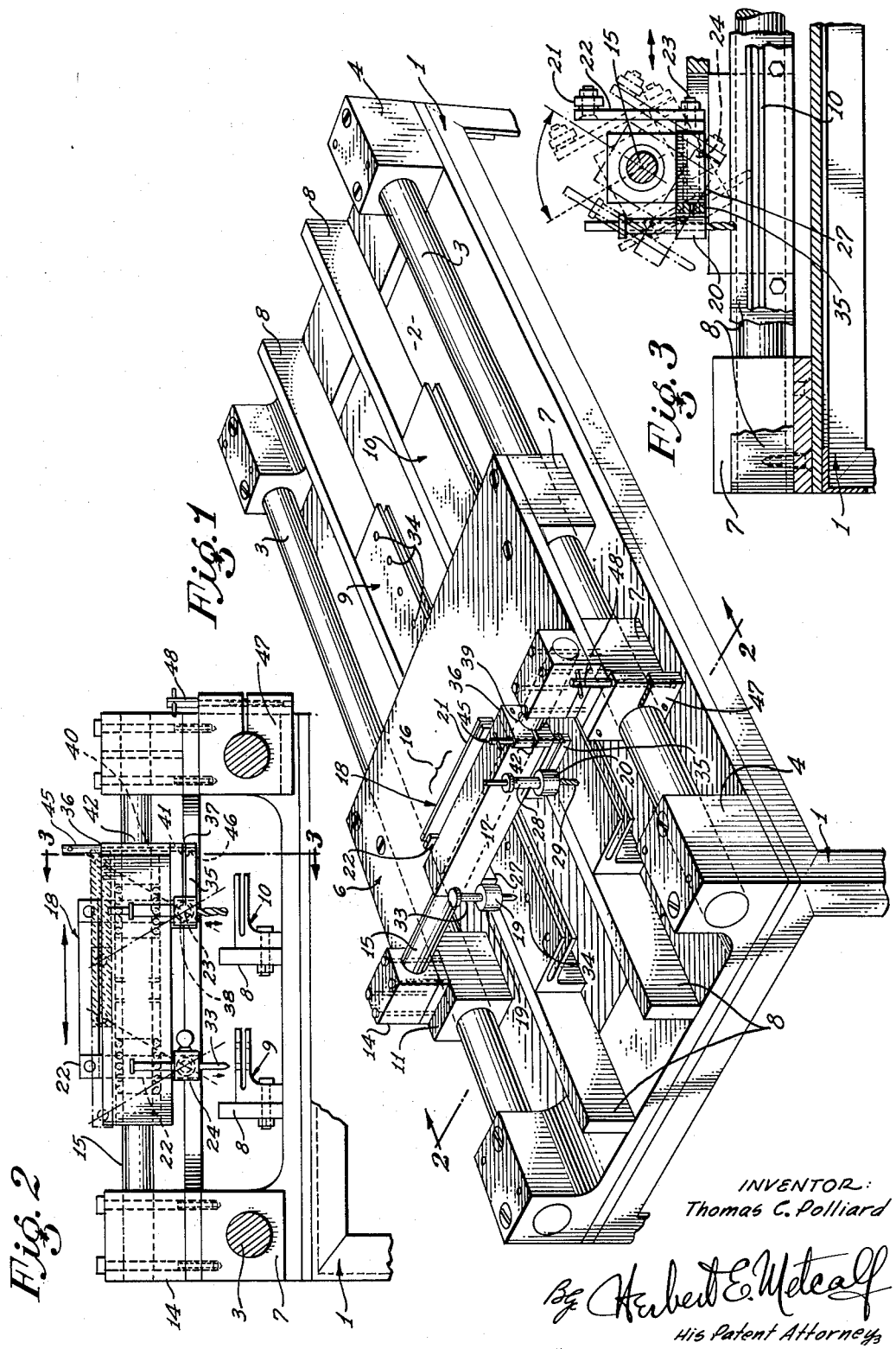

2,732,734

HOLE BORE ANGLE DUPLICATOR

Thomas C. Polliard, Playa del Rey, Calif., assignor to Northrop Aircraft, Inc., Hawthorne, Calif., a corporation of California Application February 2, 1953, Serial No. 334,422

5 Claims. (Cl. 77—5)

My invention relates to machine tools and more particularly to that type used for exactly duplicating in a new part, the respective axial position of bores in a part having an aperture pattern.

It is common industrial practice to fasten component parts by use of a plurality of fasteners disposed through apertures in the respective parts. In instances of large parts such as an aircraft wing, the wing and its supporting fixture are usually drilled together so that the resulting apertures in the fixture and the wing are axially aligned. Seldom are the axes of the several apertures in parallel relation with one another, but, due to human errors in drilling they will vary in their degree of parallelism. Should it be desired to replace the fixture, such as an attach angle, it becomes important to have a means available for producing an aperture pattern in the new part which is an exact replica of the old. This obviates further drilling in the wing with its concomitant decrease in structural integrity.

Therefore, it is an object of my invention to supply a bore angle duplicator which is capable of exactly duplicating in a new part, the respective axial position of bores in a part having an aperture pattern.

A further object of my invention is to provide a new member having apertures therein which apertures exactly duplicate in position those contained in an old part which has been integrally drilled with others and substituted for by the new part.

Other objects and uses will become apparent from the subsequent disclosure.

For a complete disclosure of my invention, a detailed description of a preferred embodiment will now be given in connection with the accompanying drawings forming a part of the specification wherein:

Figure 1 is a perspective view of the invention in its assembled state showing the machine tool about to duplicate an aperture pattern in a new part.

Figure 2 is a cross-sectional view along line 2—2 of Figure 1.

Figure 3 is a cross-sectional view along line 3—3 of Figure 2.

Referring in detail to the figures, a work table 1 has on its upper surface 2, cylindrical guides 3 which are supported or journaled at their respective ends by bearings or slide blocks 4. Slidably secured to the guides 3 is a stabilizing platform or carriage 6 journaled in bearing supports 7. Attached to the table 1 are parallel elongated metal supports or plates 8. Releasably secured to one support is the part 9, i. e., the one already prepared with an aperture pattern to be duplicated. Similarly secured to the other support is the new part 10 in which the holes are to be drilled. It should be noted that the supports 8 may be used for mounting more than one part. Affixed to the front two bearing supports 7 at their top surface 11, are smaller bearing supports 14, securing a cylindrical cross-bar 15 which supports and guides a duplicator-fitting 16, allowing the fitting to be rotated thereon as desired. The fitting 16 comprises a rectangular block 17 having a bore therethrough of sufficient diameter to allow for free rotation of the block 17 on the cross-bar 15, a link mechanism 18 and guides 19 and 20. The link mechanism 18 comprises a transverse bar 21 pivotally connected at both ends to vertical bars 22 which in turn are releasably fastened by conventional fasteners 23 to longitudinal shafts 24 which pass through pillow bearings 27 at the base of the block 17. The shafts 24 are formed integrally, by casting, with the drill guide 20 and the pin guide 19 and are able to pivot with respect to the block 17 as shown in Figure 2. A bushing 28 is provided for guiding the drill bit 29 into the work 10. Clamps 35 and 36 are provided to maintain the axial position of the pin guide 19 and the drill guide 20, as determined by adjusting the pin 33 which is slidable in its guide 19 and the pin guide 19 until the pin 33 is able to pass smoothly through a hole 34, in the part 9. The clamp 35 is formed as a bar slit at 37 from one end, to a hole 38 and is placed around the shaft 23. A hole 40 is drilled through the block 17 at the split end and passes through the clamp 35, the clamp portion of the drilled hole 40 being tapped at 41. The clamp 36 is formed as a narrow block fixedly secured to the block 17, and is likewise provided with a slit 42, extending from one edge to the central aperture 39 of the clamp 36 and the hole 40 extends through the clamp 36 from top to bottom. Thus when a shouldered member 45 mounted in the drilled hole is turned, a threaded portion 46 at the end of the member 45 engages the tapped portion 41 of the clamp hole 40 and draws the slits 37 and 42 together, tightening both the clamps 35 and 36 about the bars 24 and 15, and thus securing the guides 19 and 20 and block 17 in the desired position. The carriage 6 is provided with a clamp 47 similar in construction to clamp 36. Turning a shouldered member 48 locks the carriage 6 in any desired position on the cylindrical guides 3.

For a better understanding of my invention a short discussion of the operation of the angle bore duplicator will follow. The part 9 to be duplicated is attached to the supporting plate 8 nearest the pin guide 19, while the new part 10 to be drilled is attached to the other plate 8 in exact registration with part 9. When extremely close tolerances may be necessary, only two supporting plates 8 are used. Where tolerances are not critical, the work table 1 might be made wider to accommodate more plates with consequent multiple drilling. The pin guide 19 is adjusted to a position where the pin 33 is able to smoothly pass through a hole 34 whose angular position and bore is to be duplicated in the new part 10. Due to the link mechanism 18 the drill guide 20 is moved to the same relative position as that of the pin guide 19. It is to be noted that the guides 19 and 20 have relative motion in four directions, viz, clockwise and counterclockwise motion in a longitudinal plane of reference, or specifically, with respect to the cylindrical cross-bar 15 as shown in Figure 3 and similar motion in a transverse plane of reference, or specifically with respect to the shafts 24 as shown in Figure 2. Once the guides 19 and 20 are positioned, the clamps 35, 36, and 47 are tightened, thus securing the carriage 6 and duplicator-fitting 16 in place. A drill 29, which may be an electrically powered hand drill, is then used for making the desired hole in the new part 10.

It may be desired to go into a shop production run where a very thin template will be used in place of the part 9 and/or where it is desired to drill all the apertures at a given angle. In such cases, clamps 35 and 36 may be designed with individual locking means rather than in the shown embodiment where a shouldered member 45 locks both.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a duplicator machine having a work table to which are secured a part having drill holes therethrough and an identical workpiece to be drilled in exact accordance with said part, guide means on and extending along the margin of said table, and a carriage mounted for movement along said guide means; an elongated member, a pin guiding member mounted on said elongated member toward one end thereof for locating the holes in said part; a drill guiding member mounted toward the opposite end of the elongated member at a fixed distance from said pin; means mounting said elongated member for rotation about an axis transverse to the guide means extending along the margin of said table to effect drilling of holes in the workpiece on axes identically inclined to the axes of holes in the part; means mounting the pin and drill holding members for simultaneous and equal tilting adjustment; and means for clamping said elongated member and pin and drill holding members in adjusted position.

2. A duplicator machine as set forth in claim 1: characterized by a pin guide supporting shaft rotatably mounted in said elongated member and extending transversely of the axis thereof; a drill guide supporting shaft rotatably mounted in said elongated member parallel to and in the same plane as said pin supporting shaft; bars of equal length secured to the end portions of the shafts and extending normal thereto; and a transverse bar connecting the ends of the bars secured to the end portions of the shafts and constraining said shafts to equal angular movement.

3. A duplicator machine as set forth in claim 1: comprising a cross bar mounted on the carriage, said elongated member being carried on said cross bar for movement along the axis thereof.

4. In a duplicator machine having a work table to which are secured a part having drill holes therethrough and an identical workpiece to be drilled in exact accordance with said part, guide means on and extending along the margin of said table, and a carriage mounted for movement along said guide means; an elongated member having an axial bore therethrough; a bar having a sliding fit with the bore of said fitting; members at each side of said carriage mounting said bar to extend across said carriage and to hold said bar against movement, the elongated member being mounted on the bar between said mounting members; a locating pin guide supporting shaft rotatably mounted in said fitting and extending transversely of the axis thereof; a drill guide supporting shaft rotatably mounted in said fitting parallel to said pin guide supporting shaft; bars of equal length secured to the end portions of the shafts and extending normal thereto; a transverse bar connecting the ends of the bars and constraining said shafts to equal angular movement; and a single clamping means effective to both hold the elongated member in adjusted position axially and angularly of said bar, and to hold the pin and drill guides in angular adjustment relative to said elongated member.

5. A duplicator machine as set forth in claim 3 and in which the clamping means adjustable to hold the elongated member against movement comprises a first split member secured to said elongated member and surrounding said bar; a second split member surrounding one of said shafts and underlying said first split member; and a common operating member effective to clamp the first split member on said bar and the second split member on the shaft on which it is mounted.

References Cited in the file of this patent

UNITED STATES PATENTS

| | | |
|---|---|---|
| 447,014 | Pryibil | Feb. 24, 1891 |
| 1,207,717 | Dartt | Dec. 12, 1916 |
| 2,383,655 | Johnson | Aug. 28, 1945 |
| 2,623,419 | Wales | Dec. 30, 1952 |